Jan. 24, 1956    H. F. EICHENBERGER ET AL    2,731,830
ROTAMETER AND METERING TUBE THEREFOR

Filed Feb. 14, 1952        2 Sheets-Sheet 1

INVENTORS.
HENRY F. EICHENBERGER
BY NATHANIEL BREWER

Leonard L. Kalish
ATTORNEY.

Jan. 24, 1956 H. F. EICHENBERGER ET AL 2,731,830
ROTAMETER AND METERING TUBE THEREFOR
Filed Feb. 14, 1952 2 Sheets-Sheet 2

INVENTORS.
HENRY F. EICHENBERGER
BY NATHANIEL BREWER
Leonard L. Kalish
ATTORNEY.

United States Patent Office 2,731,830
Patented Jan. 24, 1956

2,731,830
ROTAMETER AND METERING TUBE THEREFOR

Henry F. Eichenberger, Doylestown, and Nathaniel Brewer, Newton, Pa., assignors to Fischer & Porter Company, Hatboro, Pa., a corporation of Pennsylvania Application February 14, 1952, Serial No. 271,536

3 Claims. (Cl. 73—209)

The present invention relates to flow-meters and relates more particularly to flow-meters for measuring comparatively low or small rates of flow.

In variable-area type of rate-of-flow meters, the movable element or so-called "float" which responds to the changes in flow-rate or which indicates or reflects the rate-of-flow, presents many problems of stability and support and visibility. In rate-of-flow meters of the variable-area type (commonly called "rotameters"), the so-called "float" has been streamlined, in bobbin fashion, so as to be centered by the fluid flowing past it. Such dynamically-centered floats are suitable under some conditions but quite impracticable and inoperative under other conditions. For this reason, wire-guided floats and arrangements have been provided, as for instance in Patent No. 2,321,041. However, for certain purposes and under many circumstances the guide-wire supported or guide-wire stabilized float becomes impracticable and undesirable. Thus, the wire is subject to corrosion, and is subject to "jamming" in respect to the hole in the float through which it passes, thereby impairing the full free response of the float to the rate-of-flow. In addition, under varying operating conditions the wire may become loose and may buckle and thus likewise impair the full free response of the float. Floats have also been centered or "supported" by means connected with the side-wall of the metering-tube, as, for instance in Patent 2,441,350.

However, for tapered tubes having very small-diametered bores, even the construction or arrangement disclosed and claimed in Patent 2,441,350 is not quite adequate, projecting inwardly, as they do, from the inner tapered wall of a tapered-tube metering-chamber, become so small in cross-section that they become fragile and tend to chip off under the impact of the metering-float, because of the tendency of the "float" to chatter or to vibrate laterally under many operating conditions. On the other hand, fluted metering tubes or metering chambers such as those disclosed in Patents 2,384,800, 2,389,957, 2,403,849 and 2,417,352, in which a generally cylindrical tube is provided (as distinguished from a tapered tube) and in which a plurality of channels are extended outwardly from the generally cylindrical inner surface of the tube, with the cross-sections of the channels varying from bottom to top, so as to create a variable-area flow-passageway (commonly called "fluted" rotameters or "fluted" metering tubes) are not as desirable nor as effective as the tapered tubes with the inwardly projecting beads of Patent 2,441,350, because of the comparatively large contact area or contact-lines which are created between float and guides and because of other undesirable characteristics. Likewise, just as the blead-guides of the tube of Patent 2,441,350 are unsuitable for very small bore metering tubes or metering chambers, so the fluted tubes or fluted metering chambers of the aforesaid Patents 2,384,800, 2,389,957, 2,403,849 and 2,417,352 are likewise unsuitable for very small-bore metering tubes because of the difficulty of forming flutes of such small cross-section and maintaining them accurately and having their taper uniform.

Thus, all the metering tubes or metering chambers of the prior art, above referred to (i. e., either the bead-bearing tapered tubes or the fluted cylindrical tubes) lack what is commonly called "reproducability" in small sizes, namely the ability to maintain a uniformity of production such as would permit making them on a mass-production basis and to permit the replacement of one tube with another (in the case of breakage or the like) without individual and separate calibration of each and every tube. Thus, in order to make rotameters both accurate and comparatively inexpensive, it becomes necessary that the metering tubes or metering chambers should be capable of being formed, successively, on the same mandrel, without any deviations between successive tubes made from the same mandrels, so that a set of calibrations evolved for one tube made from such mandrel will be equally accurate when applied to any other tube made from the same mandrel.

According to the present invention a generally tapered tube is provided, which is characterized by three flat surfaces related to each other as the three sides of an equilateral triangle whose sides are tangent to a cylinder of a diameter substantially equal to the diameter of the float (plus only working clearance), which diameter is also the entrance-diameter or small-diameter of the metering tube or the small inner diameter of the tapered tube. Combined with such tapered tube having three flat float-guiding surfaces, arranged as the three sides of an equilateral triangle is a float which will present a point contact to each such flat guide-surface. Thus, the advantages of a tapered tube and the advantages of the guide-beads of Patent 2,441,350 may be achieved in small-bore metering tubes or chambers with a high degree of reproducability and accuracy, without the hazard of damaging the beads, as would be the case if beads were used in very small bore tubes.

According to the present invention the 3-point float-support of Patent 2,441,350 is achieved, without inwardly-projecting thin beads, while, at the same time, the advantages of a truely tapered chamber are preserved.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

Figure 8 is a perspective view of a mandrel used in the formation of the metering tube shown in Figure 1.

Figure 1:
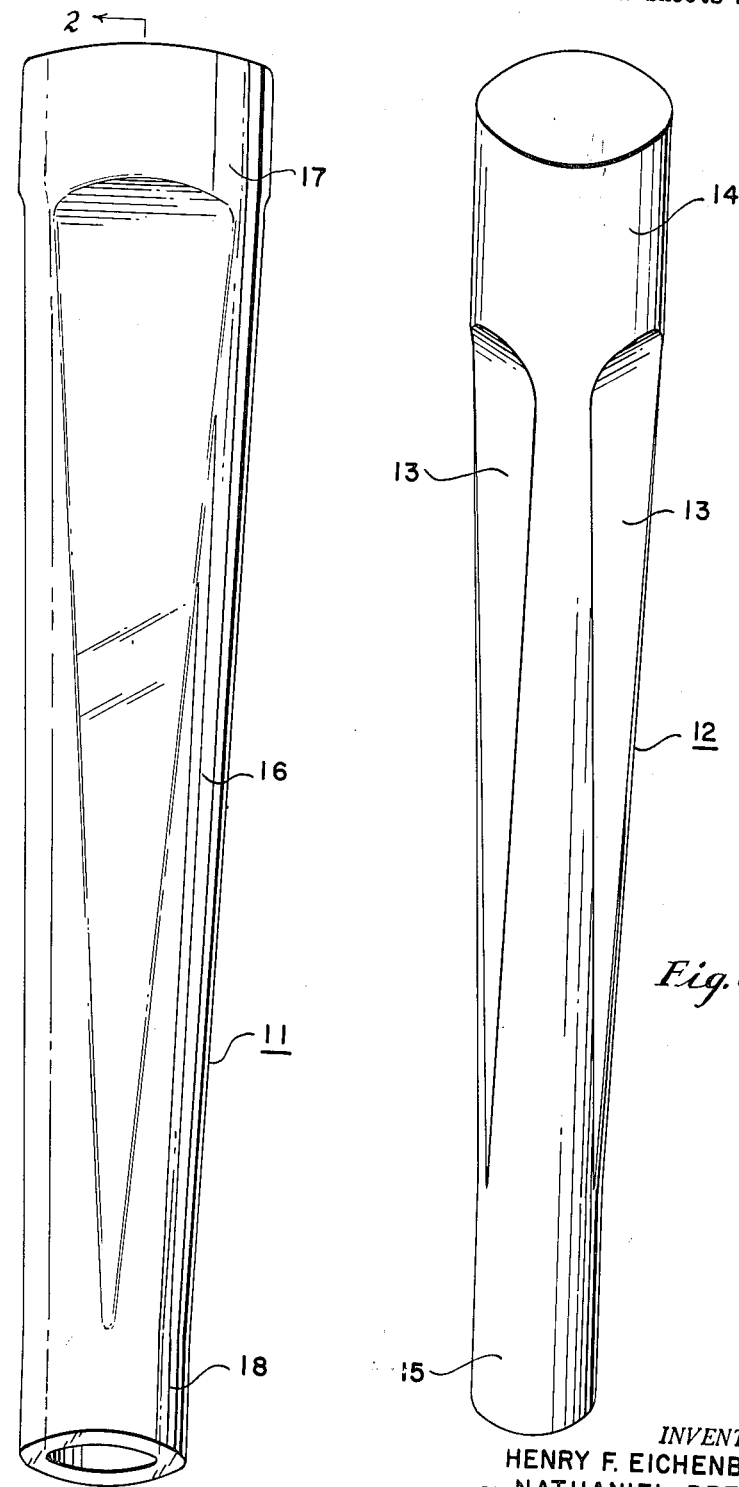
Figure 1 is a perspective view of a metering tube of the present invention.
Figure 2:
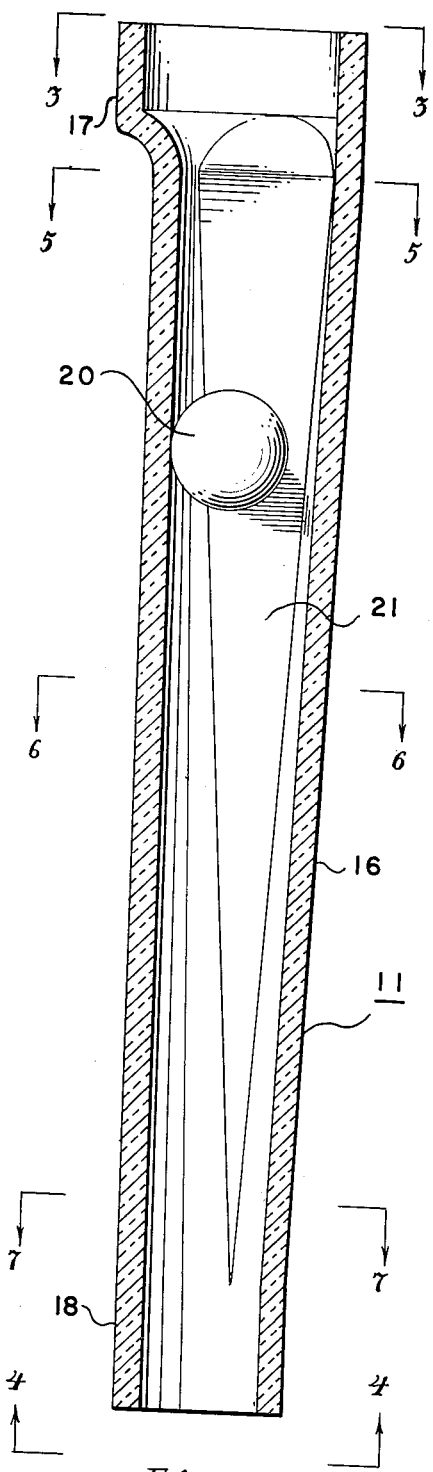
Figure 2 represents a longitudinal cross-sectional view taken generally along line 2—2 of Figure 1.
Figure 3:
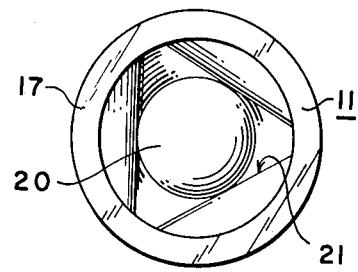
Figure 3 represents an end view of the discharge-end or large-diameter of the metering tube of Figure 1.
Figure 5:
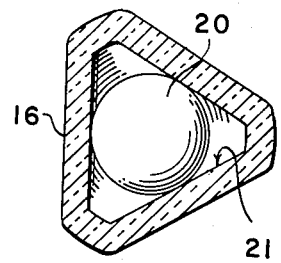
Figure 5 is a transverse cross-sectional view taken generally along line 5—5 of Figure 2.
Figure 6:
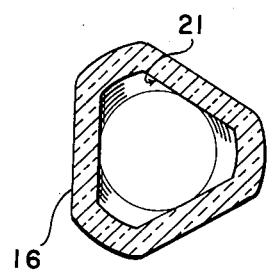
Figure 6 is a transverse cross-sectional view taken generally along line 6—6 of Figure 2.
Figure 7:
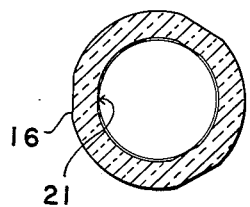
Figure 7 is a transverse cross-sectional view taken generally along line 7—7 of Figure 2.
Figure 4:
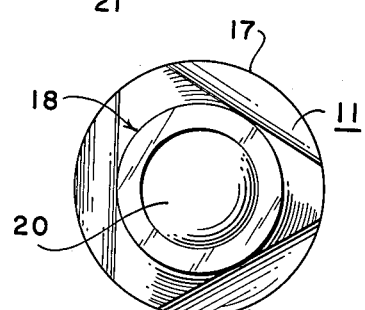
Figure 4 represents an end view of the entrance end or small-diametered end of the metering tube of Figure 1.

The metering tube or metering chamber designated generally by the numeral 11, is formed upon the mandrel 12, upon a glass lathe such as, for instance, as shown in Patent 2,423,113 or 2,490,252 or 2,470,234.

The mandrel 12 is essentially a tapered or conical or frusto-conical mandrel, of the desired taper, on which three "flats" are provided by milling or grinding (or first milling and then finish-grinding, as shown particularly in Figure 8); the three flats being uniformly spaced around the circumference, and the flats diminishing in width, to substantially a point, at the small diametered end of the mandrel. Thus, these 3 flats, designated generally by the numeral 13, are disposed at 60° to each other (internal angle), with the wide end of each flat terminating preferably in a curve leading to the outer cylindrical terminal portion 14 of the mandrel which portion forms the cylindrical inoperative end of the metering chamber which is supported in the stuffing glands or supports of the rotameter housing. Likewise, the lower or small-diametered end 15 of the mandrel is also cylindrical (below the tapered portion) to provide a lower inoperative cylindrical tube-extension to be engaged in and sealed in the lower stuffing box or gland of the rotameter frame or housing.

The tapered metering chamber 16 thus terminates in the upper cylindrical portion 17 and the lower cylindrical portion 18.

The tapered metering tube 11 is supported in any suitable rotameter frame or housing, as, for instance that shown in Patents 2,490,792, 2,437,247, 2,426,263 and 2,350,343.

The float 20, is preferably in the form of a sphere or ball (of suitable density or specific gravity for the rate of taper and for the liquid being measured and the flow-rates to be comprehended by the meter). A clearance of about .0005 inch, more or less, is provided between the spherical surface of the ball 20 and the flats 21 on the inside of the tapered tube.

A rotameter of high accuracy and reproducability is provided by the foregoing construction in which rotameters a dynamically-unstable float is well supported thereby to prevent lateral chatter and to prevent breakage of its supporting means, while maintaining the advantages of a tapered tube metering chamber.

Thus, the metering chamber of the present invention may be viewed, in the form shown in the drawings, as a tri-flat tapered-tube. However, more than three regular equi-distant guide-surfaces may be used for the sphere or ball-guiding means within a tapered tube.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention what is claimed as new and is to be protected by Letters Patent is the following:

1. A rotameter including an elongated vertical transparent metering tube having a small-diametered inlet opening and a tapered inner bore of progressively increasing cross-sectional area and having not less than three flat guiding surfaces formed on the inner wall, said guiding surfaces arranged equi-distantly around and tangent to a cylinder of a diameter substantially equal to the inner diameter of the inlet-opening of the metering tube and each of said guiding surfaces occupying a plane substantially parallel to the longitudinal axis of the metering tube, said metering tube having an upper cylindrical extension and a generally cylindrical lower extension formed integrally therewith and each of said flat guiding surfaces terminating short of said cylindrical extensions, and a flow-constricting metering float having a diameter substantially the same as said cylinder and related to said flat guiding surfaces so as to make point-contact therewith.

2. A rotameter including an elongated vertical transparent metering tube having a small-diametered inlet opening and a tapered inner bore of progressively increasing cross-sectional area and having not less than three flat guiding surfaces formed on the inner wall, said guiding surfaces arranged equi-distantly around and tangent to a cylinder of a diameter substantially equal to the inner diameter of the inlet-opening of the metering tube and each of said guiding surfaces occupying a plane substantially parallel to the longitudinal axis of the metering tube, and a flow-constricting metering float having a diameter substantially the same as said cylinder and related to said flat guiding surfaces so as to make point-contact therewith.

3. A rotameter including an elongated vertical transparent metering tube having a small-diametered inlet opening and a tapered inner bore of progressively increasing cross-sectional area and having three flat guiding surfaces formed on the inner wall, said guiding surfaces arranged equi-distantly around and tangent to a cylinder of a diameter substantially equal to the inner diameter of the inlet-opening of the metering tube and each of said guiding surfaces occupying a plane substantially parallel to the longitudinal axis of the metering tube, and a flow-constricting metering float having a diameter substantially the same as said cylinder and related to said flat guiding surfaces so as to make point-contact therewith.

References Cited in the file of this patent

UNITED STATES PATENTS

| | | |
|---|---|---|
| 1,301,714 | Kueppers | Apr. 22, 1919 |
| 1,889,705 | Sherwood | Nov. 29, 1932 |
| 2,417,352 | Cox | Mar. 11, 1947 |